(12) United States Patent
Knapp et al.

(10) Patent No.: US 6,700,759 B1
(45) Date of Patent: Mar. 2, 2004

(54) NARROW TRACK WIDTH MAGNETORESISTIVE SENSOR AND METHOD OF MAKING

(75) Inventors: Kenneth E. Knapp, Livermore, CA (US); Kyusik Sin, Palo Alto, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 221 days.

(21) Appl. No.: 09/585,988

(22) Filed: Jun. 2, 2000

(51) Int. Cl.$^7$ .................................................. G11B 5/39
(52) U.S. Cl. .................................................. 360/324.2
(58) Field of Search ...................... 360/324.1, 324.11, 360/324.12, 324.2

(56) References Cited

U.S. PATENT DOCUMENTS

| | | | |
|---|---|---|---|
| 5,459,099 A | 10/1995 | Hsu | 437/180 |
| 5,559,654 A | 9/1996 | Das | 360/126 |
| 5,621,596 A | 4/1997 | Santini | 360/126 |
| 5,729,410 A | 3/1998 | Fontana, Jr. et al. | 360/113 |
| 5,784,224 A | 7/1998 | Rottmayer et al. | 360/113 |
| 5,792,510 A | 8/1998 | Farrow et al. | 427/130 |
| 5,862,022 A | 1/1999 | Noguchi et al. | 360/113 |
| 5,880,912 A | 3/1999 | Rottmayer | 360/113 |
| 5,883,763 A | 3/1999 | Yuan et al. | 360/113 |
| 5,898,548 A | 4/1999 | Dill et al. | 360/113 |
| 6,005,753 A | 12/1999 | Fontana, Jr. et al. | 360/113 |
| 6,023,395 A | 2/2000 | Dill et al. | 360/113 |
| 6,043,960 A | 3/2000 | Chang et al. | 360/126 |
| 6,054,023 A | 4/2000 | Chang et al. | 204/192.2 |
| 6,259,586 B1 * | 7/2001 | Gill | 360/324.2 |
| 6,381,107 B1 * | 4/2002 | Redon et al. | 360/324.2 |

OTHER PUBLICATIONS

Karpov et al., "Patterning of Vertical Thin Film Emitters in Field Emission Arrays and their Emission Characteristics," 9$^{th}$ International Vacuum Microelectronics Conference, St. Petersburg 1996, pp. 501–504.

Tsutsumi et al., "Fabrication Technology of Ultrafine SiO$_2$ Masks and Si Nanowires using Oxidation of Vertical Sidewalls of a Poly–Si layer," Journal of Vacuum Science Technology B, vol. 17, No. 1, Jan./Feb. 1999, pp. 77–81.

Ishi et al., "Highly Defined Narrow Track Write Heads Fabricated by Focused Ion Beam Trimming with the Al$_2$O$_3$ Refilling Process," IEEE Transactions on Magnetics, vol. 35, No. 5, Sep. 1999, pp. 2541–2543.

Khizroev et al., "Recording Heads with Track Widths Suitable for 100 Gbit/in$^2$ Density," IEEE Transactions on Magnetics, vol. 35, No. 5, Sep. 1999, pp. 2544–2546.

* cited by examiner

Primary Examiner—David L. Ometz
(74) Attorney, Agent, or Firm—Mark Lauer (57) ABSTRACT

An electrically conductive sidewall for an electromagnetic transducer having a magnetoresistive sensor is formed as a layer oriented substantially perpendicular to other layers of the sensor, and is used as a mask for defining the width of the sensor. This allows the sensor to be made much thinner than conventional sensors, providing higher resolution in a track width direction. The sidewall can be nonmagnetic, serving as a spacer between the magnetic sensor layers and an adjacent magnetic shield without the need for a protective cap to guard against damage from polishing and wet etching. Alternatively, the sidewall can be magnetic, serving as an extension of the shield. In either case, the sidewall reduces the effective length of the sensor for linear resolution, sharpening the focus of the sensor and increasing linear density. Also reduced is the tolerance for error in sensor width and length. The combination of increased resolution in track width and track length directions provides a large increase in areal resolution, such that sensors in accordance with the present invention may be able to resolve signals at a density exceeding a terabit per square inch. A correspondingly narrow pole-tip for an inductive transducer that may be employed in conjunction with the magnetoresistive sensor is also disclosed.

23 Claims, 8 Drawing Sheets

NARROW TRACK WIDTH MAGNETORESISTIVE SENSOR AND METHOD OF MAKING

BACKGROUND

A key measure of the performance of an electromagnetic information storage system is the areal density. The areal density is the number of data bits that can be stored and retrieved in a given area. Areal density can be computed as the product of linear density (the number of magnetic flux reversals or bits per unit distance along a data track) multiplied by the track density (the number of data tracks per unit distance). As with many other measures of electronic performance, areal densities of various information storage systems have increased greatly in recent years. For example, commercially available hard disk drive systems have enjoyed a roughly tenfold increase in areal density over the last few years, from about 500 Mbit/in$^2$ to about 5 Gbit/in$^2$.

Various means for increasing areal density are known. For instance, with magnetic information storage systems it is known that storage density and signal resolution can be increased by reducing the separation between a transducer and associated media. For many years, devices incorporating flexible media, such as floppy disk or tape drives, have employed a head in contact with the flexible media during operation in order to reduce the head-media spacing. Recently, hard disk drives have been designed which can operate with high-speed contact between the hard disk surface and the head.

Another means for increasing signal resolution is the use of magnetoresistive (MR) or other sensors for a head. MR elements may be used along with inductive writing elements, or may be independently employed as sensors. MR sensors may offer greater sensitivity than inductive transducers but may be more prone to damage from high-speed contact with a hard disk surface, and may also suffer from corrosion, so that conventional MR sensors are protected by a hard overcoat.

Recent development of information storage systems having heads disposed within a microinch ($\mu$in) of a rapidly spinning rigid disk while employing advanced MR sensors such as spin-valve sensors have provided much of the improvement in areal density mentioned above. Further increases in linear density and track density have been limited by constraints in reducing the size of transducer features that interact with the media in recording and reading magnetic patterns. For example, inductive pole-tips and MR sensors are conventionally defined by photolithography, which limits a minimum track width for which magnetic patterns on the media can be written or read.

Figure 1:
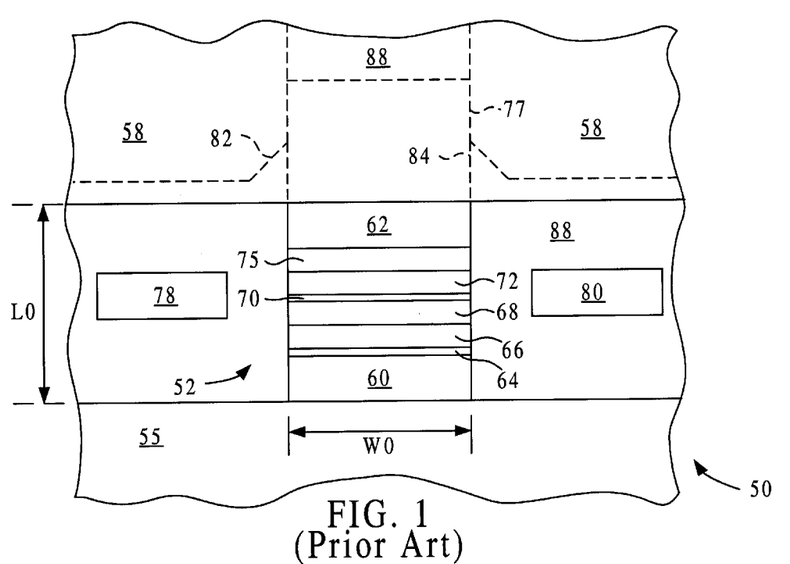
FIG. 1 (Prior Art) is a cutaway view of a media-facing side of a head focusing on a conventional transducer.

FIG. 1 (Prior Art) depicts a design for a thin film head 50 as would be seen from a media from which the head is to read magnetic signals. The head contains a spin-dependent tunneling magnetoresistive sensor 52 formed in a series of layers between first and second magnetically permeable shields 55 and 58 which also serve as leads for the sensor, as described in U.S. Pat. No. 5,898,548, incorporated herein by reference. The sensor and adjacent layers include a template layer 64 that helps with formation of a subsequently deposited antiferromagnetic layer 66. The antiferromagnetic layer 66 stabilizes the magnetic moment of a pinned ferromagnetic layer 68. An alumina ($Al_2O_3$) tunneling layer 70 separates the pinned ferromagnetic layer 68 from a free ferromagnetic layer 72 that has a magnetic moment that can rotate in the presence of a magnetic field from the media. A cap layer 75 of tantalum (Ta) is formed to protect the sensor from damage, and electrically conductive spacer layers 60 and 62 separate the sensor from the shields.

Formation of the above-mentioned elements begins by depositing the first shield 55, spacer layers 60 and 62, sensor layers 64, 66, 68, 70 and 72, and cap layer 75. After depositing the spacer, sensor and cap layers on the first shield 55, a photoresist 77 is lithographically patterned and the sensor is defined by ion milling material not protected by the resist. A width W0 of the sensor essentially corresponds to the width of the resist, although both may be thinned during the ion milling process. Alumina 88 is deposited to fill in around the sensor and a pair of hard bias layers 78 and 80 are formed to bias free layer 72, leaving a thick deposit of material atop the resist 77 and pointed projections 82 and 84 along the sides of the resist. The resist is chemically removed, which frees the material atop the resist 77, and the projections are broken off during chemically/mechanical polishing (CMP), after which the spacer 62 and second shield layer 58 are formed. An effective length L0 of the sensor for linear resolution is the spacing between the first shield 55 and second shield 58, which may be less than 0.1 micron.

Control of the ion milling for thinning the sensor 52 becomes difficult for widths W0 that are less than 0.5 micron, and errors in mask definition increase with mask thickness, but thicker masks are useful to over-etch the sensor to attempt to create spacer 60 out of shield 55. Therefore it has been difficult for such a prior art sensor to have a length-to-width ratio greater than ⅕. Moreover, forming spacer 62 from shield 58 requires the thin cap 75 to protect the sensor from damage during CMP, such as puncturing the cap with the broken off projections 82 and 84. Contamination such as wash chemicals or alumina from the CMP may also degrade the performance of the conductive spacer 62. While lithographic definition can be improved somewhat by using electron beam, X-ray or deep ultra violet lithography, such techniques are extremely capital intensive and require long lead times for equipment, development and facilities construction. Moreover, techniques such as X-ray and electron beam lithography are used to form individual sensors as opposed to more efficient simultaneous definition of all sensors on a wafer surface.

SUMMARY

In accordance with the present invention, a magnetoresistive (MR) sensor is defined by an electrically conductive sidewall layer that is oriented substantially perpendicular to most if not all other layers of the sensor, allowing the sensor to be made much thinner than conventional sensors. Such a thinner sensor can read narrower media tracks without interference from neighboring tracks, affording higher track density. The novel sidewall layer may be magnetically permeable and serve as an extension of a shield for the sensor, improving linear resolution and density. For this embodiment, an exact shield-to-shield spacing can be created based upon the sensor length, which is simply the sum of the accurately deposited sensor layers. Similarly, errors in sensor thickness can be much less than standard error tolerances for conventional sensors. The connection of the shields and the sensor can be tailored to create a device having a shape that is preferred for durability and yield as well as for electrical and magnetic considerations. Another advantage is that the sensor can be formed to a narrow width by mass production along with perhaps thousands of other sensors on a wafer, by employment of relatively inexpensive tools and processes. For conciseness this summary merely points out a few salient features in accordance with the invention, and does not provide any limits to the invention, which is defined below in the claims.

DETAILED DESCRIPTION OF THE PREFERRED EMBODIMENT

Figure 2:
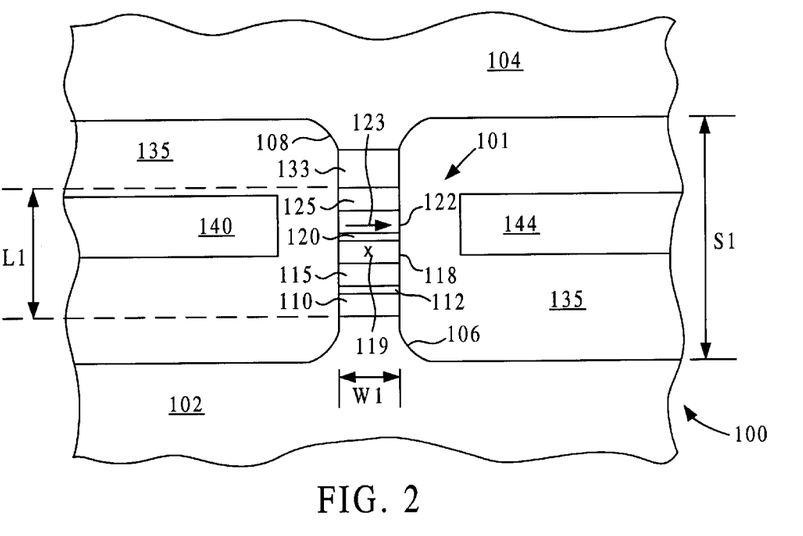
FIG. 2 is a cutaway view of a media-facing side of a head in accordance with the present invention focusing on a MR sensor having a narrow width.

FIG. 2 is a cutaway view of a media-facing side of a head 100 focusing on a MR sensor 101 having a narrow width W1. The width W1 can be as thin as a few nanometers or less and can be as thick or thicker than conventional sensors, while a presently preferred width W1 is in a range between about 0.5 micron and 0.01 micron. Such a narrow width W1 allows the sensor 101 to read from thinner tracks on the media without interference from neighboring tracks. For example, a pitch or track-to-track spacing of 0.025 micron, which may be read by the sensor 101 without off-track interference, provides a track density of one million tracks per inch.

The head 100 includes first and second magnetically permeable shields 102 and 104, which are formed of materials such as NiFe, and which in this embodiment have tapered regions 106 and 108 adjacent the sensor 101. An optional electrically conductive, nonmagnetic spacer 110, which may for instance be formed of copper (Cu) or a noble metal, adjoins the tapered section 106 of the first shield. An optional electrically conductive seed layer 112 made of a material such as tantalum (Ta) or nickel-iron-chromium (NiFeCr) is disposed between an antiferromagnetic layer 115 and spacer 110. Antiferromagnetic layer 115 stabilizes a magnetic moment of an adjoining pinned ferromagnetic layer 118 in a direction toward or away from the media, as shown by arrow end 119. A tunneling layer 120 made of non conducting material such as a dielectric separates pinned layer 118 from a free ferromagnetic layer 122, which has a magnetic moment that is able to rotate in the presence of a magnetic field from a media. In the absence of a magnetic field from a media, free layer 122 has a magnetic moment substantially parallel to the media surface, as shown by arrow 123. A second optional electrically conductive, nonmagnetic spacer 125, which may for instance be formed of Cu or a noble metal, magnetically separates the sensor from the shield 104. An electrically conductive sidewall layer 133, which in this embodiment is also magnetically permeable, adjoins the spacer 125 and the tapered region 108 of the second shield. An electrically insulating, nonmagnetic fill material 135 such as alumina encircles the sensor and a pair of hard bias layers 140 and 144 that provide magnetic bias to free layer 122.

An effective length L1 of the sensor 101 for linear resolution is simply the sum of layers 110, 112, 115, 118, 120, 122 and 125, each of which is exactingly formed to a thickness typically less than 50 Å, so that a total length L1 may be less than 200 Å. Such a minute effective length L1 sharpens the focus of the sensor and increasing linear density. Despite this minute effective length, it is possible for sensor 101 to have a length-to-width ratio greater than one. A larger spacing S1 between regions of shield layers 102 and 104 that are distal to the sensor 101 helps to avoid shorting between those layers. Also, the greater spacing of S1 compared to L1 reduces the relative capacitance of between the shields compared to that of the sensor, encouraging tunneling and increasing the potential frequency of the sensor. Such a small effective length L1 can resolve media signals at a linear density of well over one million transitions per inch. Thus the combined track and linear density provided by the present invention can resolve media signals at an areal density of over a terabit per square inch.

Figure 3:
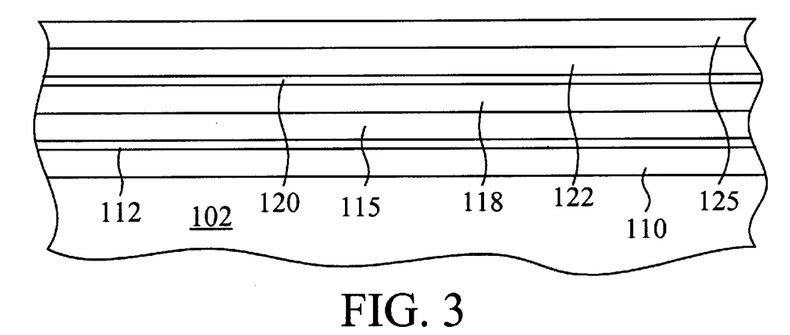
FIG. 3 is a cross-sectional view of some steps in a process for making the sensor of FIG. 2, viewed along a cross-section located close to what will become the media-facing surface.

A process for making the sensor 101 is illustrated beginning with FIG. 3, viewed along a cross-section located close to what will become the media-facing surface. The first shield 100, which may be made of NiFeX alloys (where X is Ta, Rh, Pt or Nb) or CoZrY alloys (where Y is Ti, Ta, Nb, or Hf), or FeAlSi alloys, may be formed by sputtering a seed layer followed by electroplating to a thickness of a few microns. The remaining layers shown in FIG. 3 are formed by conventional vacuum deposition techniques such as RF or DC sputtering or vapor deposition. Atop the first shield 100, optional electrically conductive, nonmagnetic spacer 110, is formed to a thickness of between about 50 Å and 200 Å of a metal such as Cu, Pt, Pd, Au, Ag or Al. Optional electrically conductive seed 112 is made of a material such as Ta or NiFeCr and formed to a thickness of between about 5 Å and 50 Å. Antiferromagnetic layer 115 is then formed of FeMn, NiMn, CoMn or IrMn, PtMn, PtPdMn to a thickness of between about 30 Å and 250Å. Instead of or in addition to antiferromagnetic layer 115, a pair of magnetostatically coupled layers sandwiching a very thin noble metal layer such as ruthenium (Rh) may be employed to stabilize the moment of pinned layer 118. Pinned layer 118 may be made of a magnetically soft ferromagnetic material such as NiFe or CoFe, or may be made of a hard bias material such as CoCr, CoPt or CoNi, or related alloys, such as CoPtT, CoPtCr, CoCrTa or CoNiPd. For the case where a hard bias material is used for the pinned layer 118, adjacent stabilizing layers may be avoided. The tunneling layer 120 of electrically insulating material such as $Al_2O_3$, $SiO_2$, SiN, SiC, AlN or $Ta_2O_5$ is then formed to a thickness of between about 5 Å and 50 Å atop pinned layer 118. For the situation in which the tunneling layer is an oxide such as $Al_2O_3$ or $SiO_2$, the oxide may be grown upon a deposited layer of Al or Si, for example. Free ferromagnetic layer 122 is then formed to a thickness of between about 10 Å and 70 Å atop tunneling layer 120. The optional second spacer 125 is then formed of a material such as Cu, Pt, Pd, Au, Ag, Al, Ta or NiFeCr.

Figure 4:
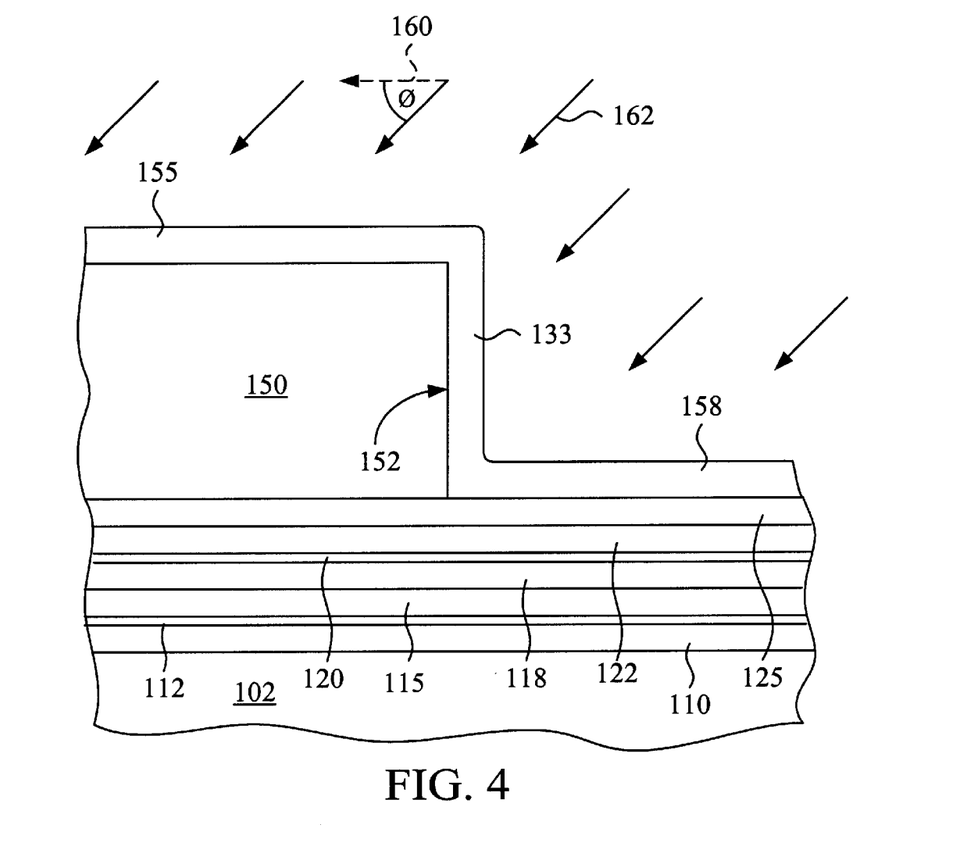
FIG. 4 is a cross-sectional view of a step in the process for making the sensor of FIG. 2, subsequent to that shown in FIG. 3.

As shown in FIG. 4, a removable base layer 150 such as photoresist is formed on the second spacer 125 and patterned to have an edge 152 aligned near a desired edge of the sensor 101. An electrically conductive material layer is then formed, creating horizontal layers 155 and 158 on the base 150 and-exposed portion of spacer 125, respectively, and forming sidewall layer 133 on edge 152. Sidewall layer 133 may have a width in a range between about ½μm and 20 nm, while extending from the sensor layers a height of between about ½μm and 10 μm. The electrically conductive material of layers 133, 155 and 158 can be non-magnetic, eliminating the need for an electrically conductive spacer 125 to magnetically separate free layer 122 from shield 104. In this case, electrically conductive layers 133, 155, and 158 may be made of Cu, Pt, Pd, Au, Ag, or alloys of such elements. In the embodiment shown, the layers 133, 155, and 158 are also magnetically permeable, and may be made of NiFeX alloys (where X is Ta, Rh, Pt or Nb) or CoZrY alloys (where Y is Ti, Ta, Nb, or Hf), or FeAlSi alloys. The layers 133, 155 and 158 may be formed in an evacuated chamber from gas, plasma or beams of ions, for example by chemical vapor deposition (CVD), plasma enhanced chemical vapor deposition (PECVD) with or without a collimator, ion beam deposition (IBD) or sputtering (RF or DC), which allows the layer 144 to be as thin as a few nanometers or less in thickness. In general, these different methods of forming the layer 144 result in a structure that is defined as vacuum-deposited. Since the layers 133 and 158 are vacuum-deposited directly on the sensor layers, a junction between layers 133 and 158 and layer 125 is free of contaminants such as alumina that may be found in prior art devices, although a perimeter of that junction will be exposed to other materials.

Electrically conductive layers 133, 155, and 158 may be formed by anisotropic formation techniques including deposition by RF or DC sputtering at a non-normal angle Ø to a direction 160 along which the sensor layers extend, as shown by arrows 162. The angle Ø may vary between less than 1° to more than 70°, and is preferably in a range between about 20° and 50°. Such angled deposition can be variable or static in both angle and flux, including rotating about edge 152. In this fashion, the thickness of layer 133 can be varied compared to that of layers 155 and 158, any of which can be made as thin as a few atoms or as thick as a few microns. The growth morphology of layer 133 is different in direction from that of layers 155 and 158 and from the sensor layers such as layers 120 and 122, since layer 133 grows outward from edge 152, while the other layers grow in a direction substantially normal to direction 160. This growth direction of layer 133 can be controlled with process parameters such as sputtering angle, and typically falls in a range between normal to the surface 152 upon which the film is being grown and 70° to that normal. The growth morphology and vacuum-deposited structure of layer 133 can be observed with a transmission electron microscope (TEM) and differentiated from layers grown in a direction substantially normal to direction 160, as well as differentiated from electroplated layers having a similar chemical composition.

Figure 5:
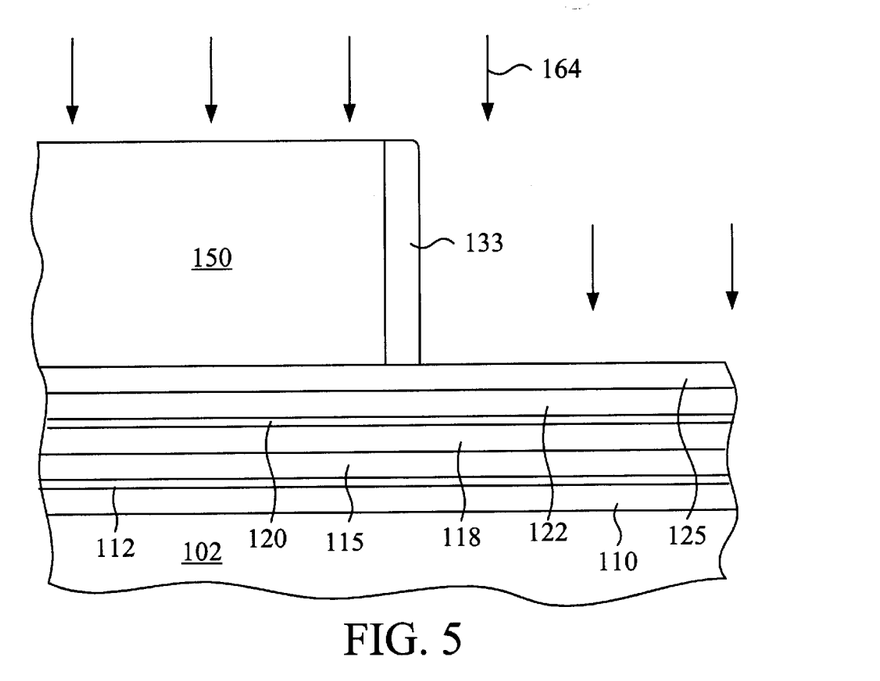
FIG. 5 is a cross-sectional view of a step in the process for making the sensor of FIG. 2, subsequent to that shown in FIG. 4.

FIG. 5 shows the preferential removal of layers 155 and 158, leaving layer 133 substantially intact. This anisotropic removal can be accomplished by ion beam or other directed impingement of particles in a substantially normal direction to the wafer surface, as shown by arrows 164. For the example of ion beam etching (IBE), the beam direction 164 should be within about 100 from normal to the wafer surface, and may be static or rotating.

Figure 6:
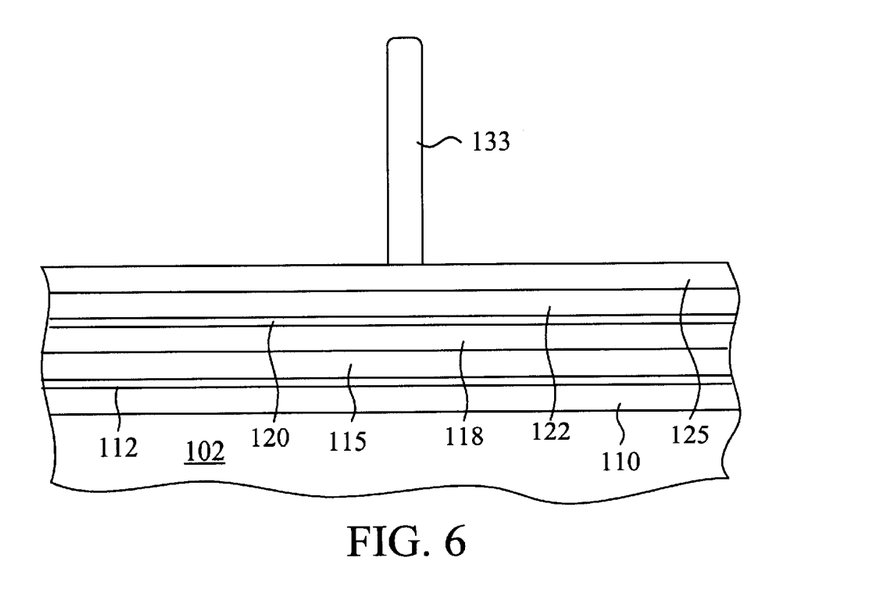
FIG. 6 is a cross-sectional view of a step in the process for making the sensor of FIG. 2, subsequent to that shown in FIG. 5.

After removing layers 155 and 158, layer 150 is removed, for example by a reactive ion etching (RIE) of $O_2$ or a similar resist ash. Removal of layer 150 leaves layer 133 standing atop the sensor layers, as shown in FIG. 6.

Figure 7:
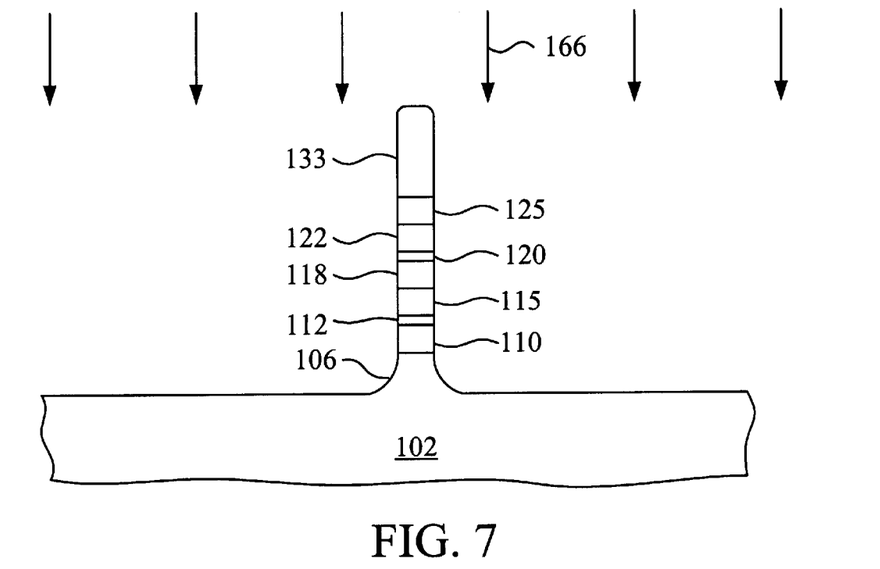
FIG. 7 is a cross-sectional view of a step in the process for making the sensor of FIG. 2, subsequent to that shown in FIG. 6.

FIG. 7 shows another anisotropic removal such as ion milling or other directed impingement of particles in a substantially normal direction to the wafer surface, as shown by arrows 166. The height of layer 133 is also reduced, and that layer as well as the sensor layers may be thinned slightly. For the example of ion milling, the beam direction 166 should be within about 450 from normal to the wafer surface, and may be static or rotating. Rotation or other directional variation of the beam direction 166 can provide tapered areas 106 during etching of the first shield 102.

Figure 8:
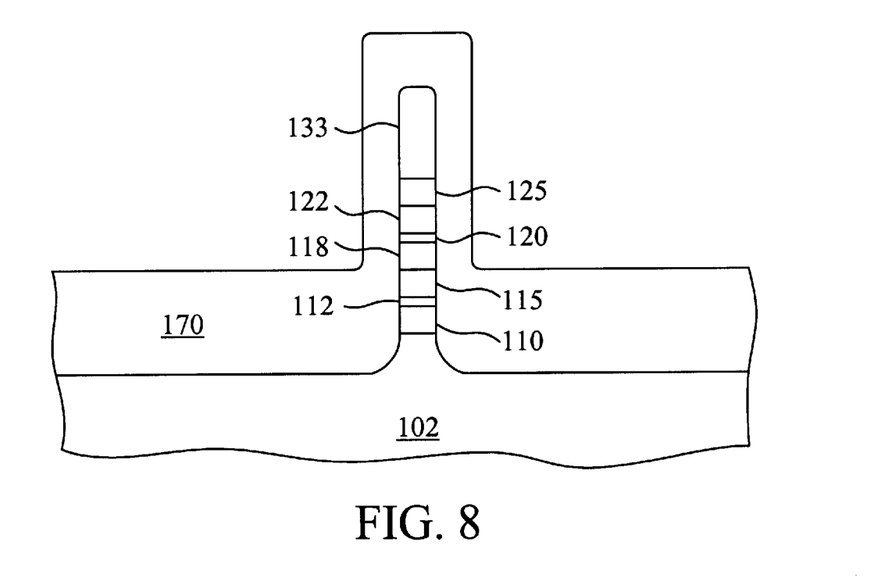
FIG. 8 is a cross-sectional view of a step in the process for making the sensor of FIG. 2, subsequent to that shown in FIG. 7.

A nonmagnetic, electrically insulating layer 170 made of alumina or similar gap materials known in the electromagnetic transducer industry is then formed on the shield and surrounding the sensor layers and sidewall layer, as shown in FIG. 8. For the situation in which hard bias layers are desired to reduce edge effects in the free layer 122, layer 170 has a thickness that extends partially up sensor layers. It may also be helpful to form layer 170 of a dielectric that etches at a faster rate than a subsequently deposited dielectric, to facilitate forming tapered areas 108 shown in FIG. 1.

Figure 9:
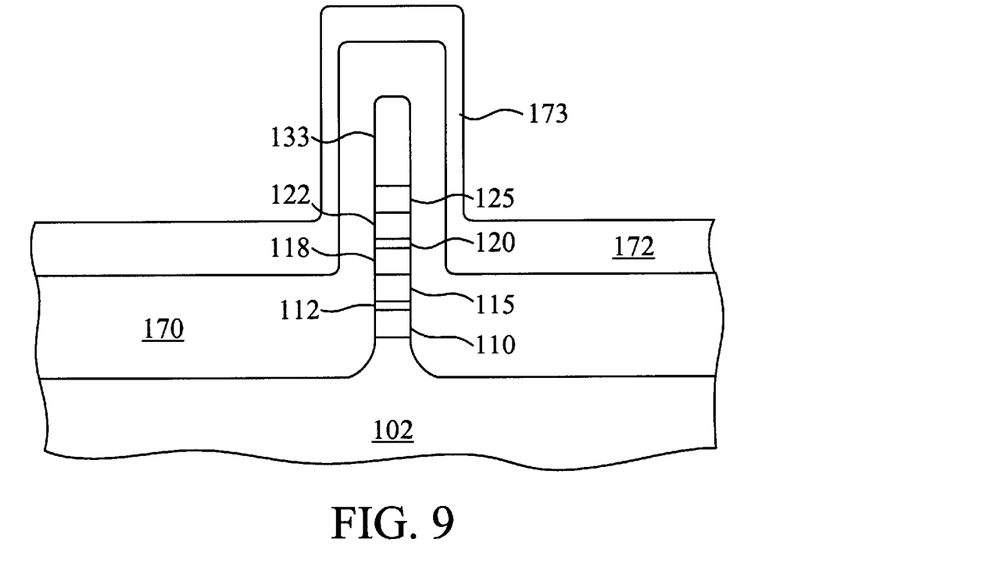
FIG. 9 is a cross-sectional view of a step in the process for making the sensor of FIG. 2, subsequent to that shown in FIG. 8.

FIG. 9 a hard bias layer 172 has been formed atop layer 170 to a thickness substantially greater than that of free layer 122. A Cr or NiAl seed may be formed prior to the hard bias formation. The hard bias layer 172 may be formed in the presence of a magnetic field and made of a material such as CoCr, CoPt, or CoNi or related alloys, such as CoPtTi, CoPtCr, CoCrTa, CoNiPd, CoCrTaPt or CoCrPtB. A thinner portion 173 of hard bias layer 172 extends over sidewall 133.

Figure 10:
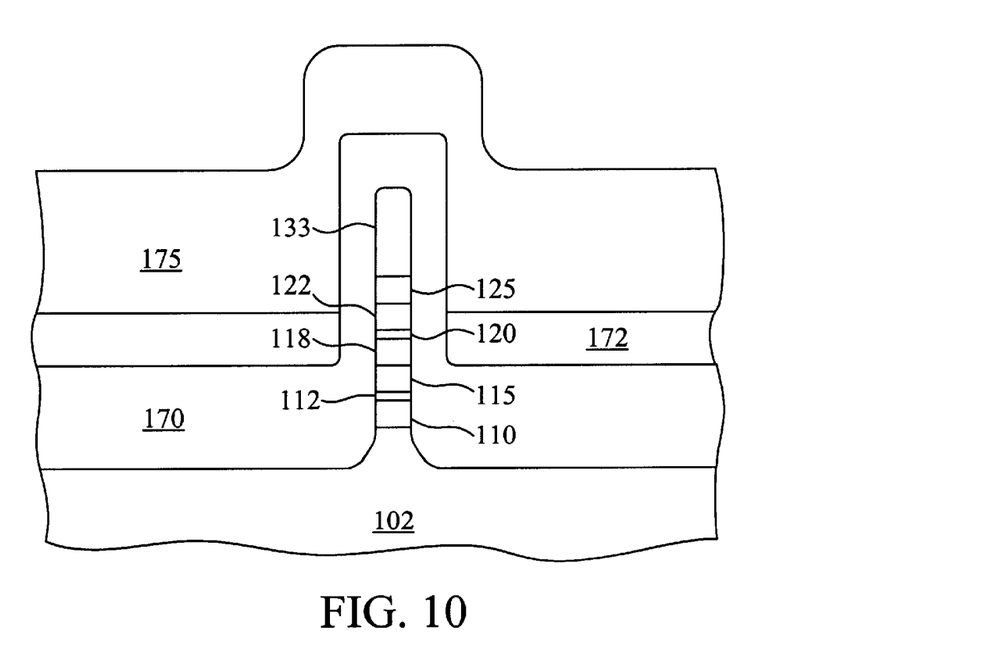
FIG. 10 is a cross-sectional view of a step in the process for making the sensor of FIG. 2, subsequent to that shown in FIG. 9.

In FIG. 10 the thinner portion 173 of the hard bias layer 172 has been removed, for instance by IBE at greater than 45° from normal to the wafer surface, such as at 60° to 80° from normal to the wafer surface, which may also tend to remove some of the rest of layer 172. Another nonmagnetic, electrically insulating layer 175 made of alumina or similar materials is then formed to a thickness that extends partially up the sidewall layer 133, as well as a forming a cap 178 over layer 133. As mentioned above, layer 175 may be more impervious to IBE or other etching than insulating layer 170 or metallic sidewall layer 133, so that layer 175 etches at a slower rate than layers 170 and/or 133, helping to form tapered areas 108 shown in FIG. 1.

Figure 11:
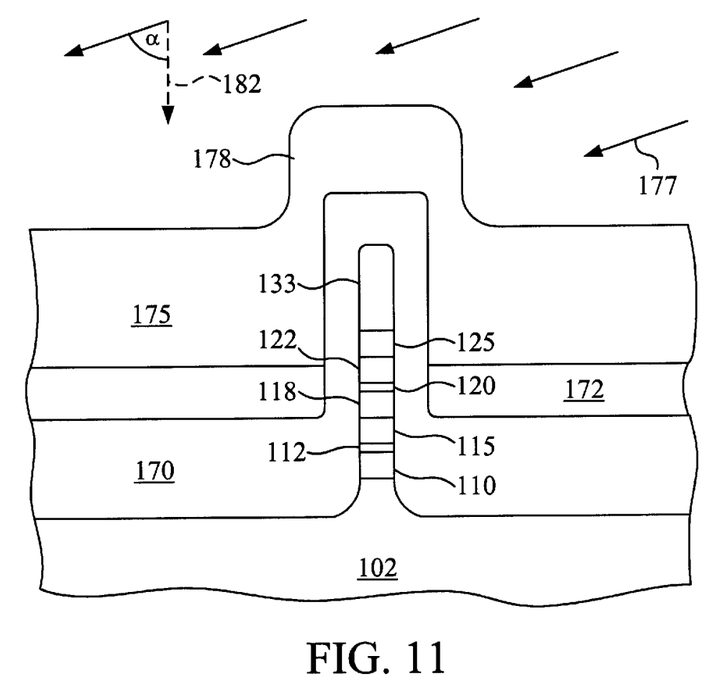
FIG. 11 is a cross-sectional view of a step in the process for making the sensor of FIG. 2, subsequent to that shown in FIG. 10.

FIG. 11 shows the preferential removal of the cap 178, for instance by IBE at an angle α greater than 45° from normal 182 to the wafer surface, as shown by arrows 177. The IBE or other directed removal may be at 60° to 80° from normal to the wafer surface, which may also tend to remove some of the rest of layer 175. A top portion of layer 170 may also be removed by this preferential removal of the cap 178 and, depending upon the height of sidewall 133, some of that layer 133 may be removed as well.

Figure 12:
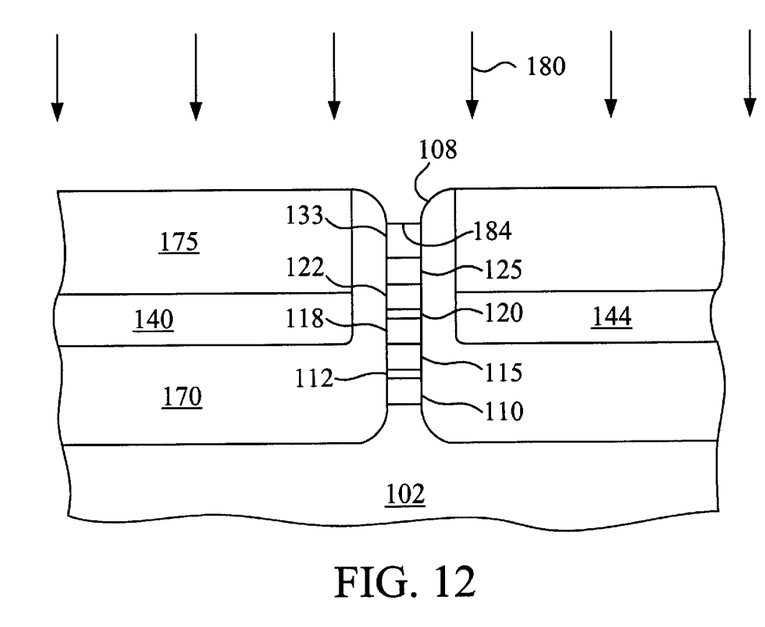
FIG. 12 is a cross-sectional view of a step in the process for making the sensor of FIG. 2, subsequent to that shown in FIG. 11.

FIG. 12 shows that after the preferential removal of cap 178, the direction of IBE may be much closer to normal to the wafer surface, preferably at an angle less than 45° from normal to the wafer surface as shown by arrows 180. The faster etch rate of layer 133 and, optionally, layer 170 as compared with layer 175 causes the formation of tapered area 133 above the sensor layers. The amount and rate of etching can be used to adjust the height of a top 184 of layer 133. Adjustment of various processing techniques and materials discussed above can vary the shape of regions adjacent the top 184 so that the regions are essentially coplanar with top 184, inverted compared with tapered areas 108, or other more complicated shapes that would be apparent to those of skill in the art. Note also that the sensor layers may be formed in a reverse order by forming a free layer, then a tunneling layer, followed by a pinned layer and a pinning layer or layers.

Figure 13:
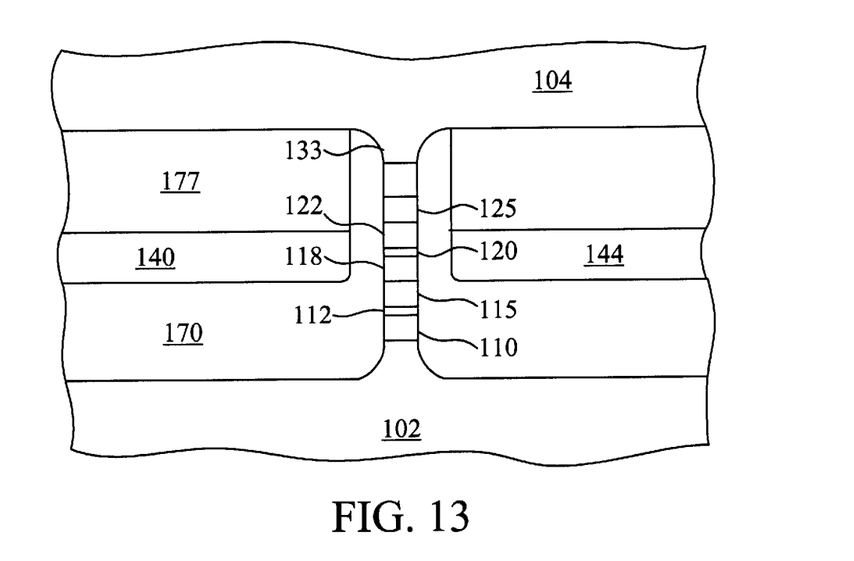
FIG. 13 is a cross-sectional view of a step in the process for making the sensor of FIG. 2, subsequent to that shown in FIG. 12.

FIG. 13 shows the formation of second magnetically permeable shield 104 atop the structure of FIG. 12. Layer 104 may be made of NiFeX alloys (where X is Ta, Rh, Pt or Nb) or CoZrY alloys (where Y is Ti, Ta, Nb, or Hf), or FeAlSi alloys, and may be formed by sputtering a seed layer followed by electroplating to a thickness of a few microns. Note that between from the formation of shield layers 102 and 104, which may include electroplating, all other process steps may be performed in a low-pressure chamber. The lack of liquid chemicals and mechanical grinding or polishing, as well as the freedom from opening the chamber to expose the delicate sensor layers to outside contaminants, can be advantageous in avoiding damage and impurities that can destroy the sensor, lower manufacturing yields and/or decrease sensor lifetimes.

Figure 14:
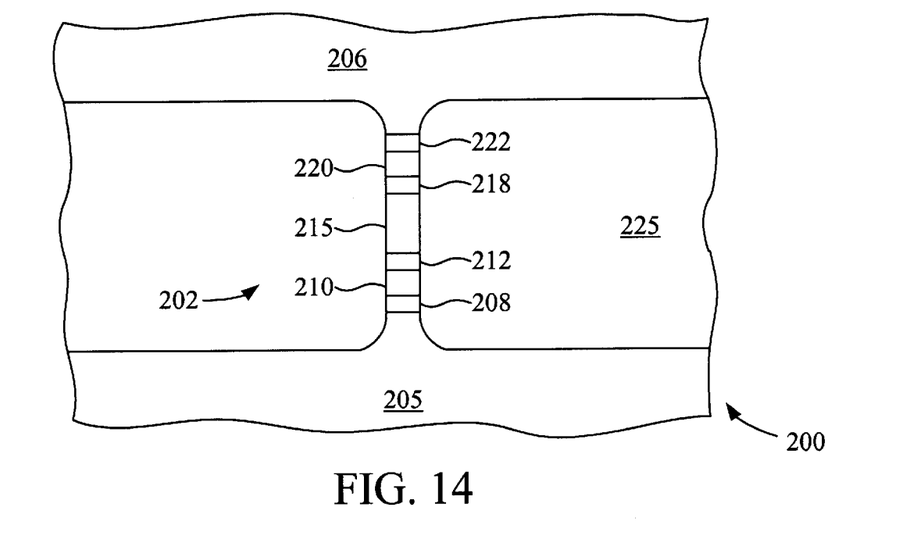
FIG. 14 is a cutaway view of a media-facing side of a head in accordance with the present invention focusing on a MR sensor having a narrow width.

FIG. 14 shows a portion of a head 200 including a MR sensor 201 that has alternating thin layers of magnetic and nonmagnetic materials, both of which are electrically conductive, as described in U.S. Pat. No. 5,883,763 and U.S. Pat. No. 5,880,912, which are incorporated by reference herein. The sensor 202 is formed in accordance with the present invention between magnetically permeable first and second shields 205 and 206, similar in composition and formation to the shields 102 and 104 described above. A first electrically conductive, nonmagentic spacer layer 208 adjoins shield 205, followed by a ferromagnetic layer 210 that may be made of a hard bias material. A second electrically conductive, nonmagentic spacer layer 212 adjoins ferromagnetic layer 210, followed by GMR element 215. GMR element 215 may contain alternating thin layers of magnetic and nonmagnetic materials, both of which are electrically conductive, and which may each have a thickness less than 50 Å, with the overall thickness of GMR element 215 in a range between about 50 Å. And 500 Å. As an example, the layers may be made of Cu and Co each having a thickness of about 20 Å.

A third electrically conductive, nonmagentic spacer 218 adjoins GMR elements 215, and a second ferromagnetic layer 220, which may be made of a hard bias material, adjoins the third electrically conductive spacer 218. An electrically conductive, nonmagentic sidewall layer 222 separates second ferromagnetic layer 220 from second shield 206. The sidewall layer 222 may be formed much as described above for sidewall layer 133, and may be magnetically permeable as well as electrically conductive for the situation, not shown in this figure, in which an electrically conductive, nonmagentic spacer separates the sidewall from magnetic layer 230 or shield 206. Nonmagentic, electrically insulating material 225 encases sensor 202 and separates shields 205 and 206.

Figure 15:
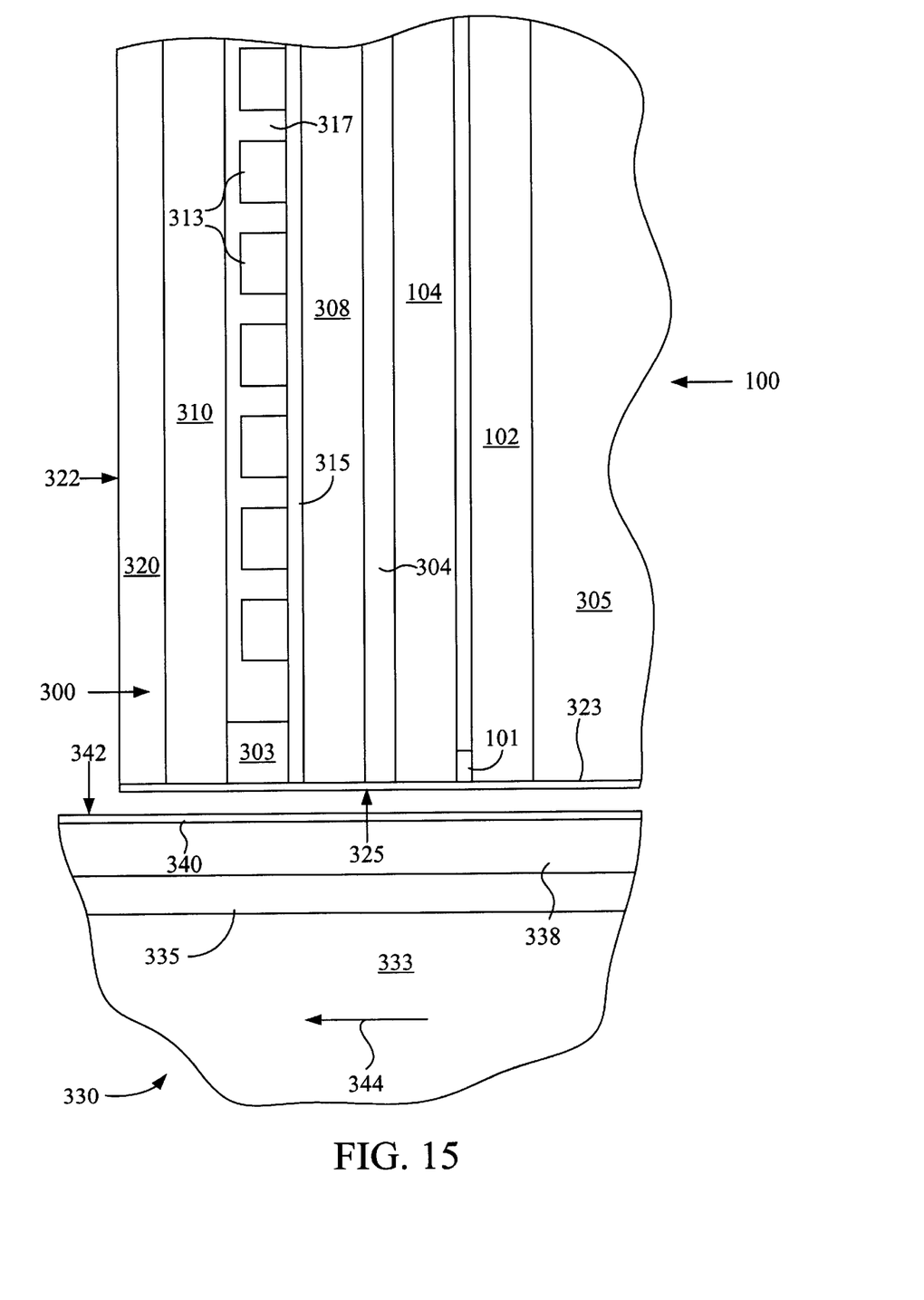
FIG. 15 is a cutaway cross-sectional view of the head in of FIG. 2 including an inductive transducer in operation reading or writing on a media.

FIG. 15 shows head 100 for an embodiment that includes an optional inductive transducer 300 having a narrow trailing pole-tip 303, as disclosed in U.S. patent application Ser. No. 09/500,380, invented by Kenneth E. Knapp et al. and incorporated by reference herein. The head 100 is formed on a substrate 305, and after formation of the shields 102, 104 and MR sensor 101, the inductive transducer 300 is formed, which may be separated from shield 104 by a nonmagentic, electrically insulating layer 304, forming a piggyback head. In an alternative embodiment, not shown, this shield and yoke are merged to form a merged head. Inductive transducer 300 includes first and second magnetically permeable yoke layers 308 and 310 sandwiching an electrical coil layer 313, separated by nonmagentic, electrically insulating layers 315 and 317. The narrow trailing pole-tip 303 is formed on a sidewall in a similar fashion as described above for sidewall layer 133, to a width that may be comparable but somewhat larger than the width W1 of sensor 101. After formation and over-etching of the sidewall to form a tapered portion of yoke 308, a nonmagentic, electrically insulating material such as alumina may be deposited and then polished to form a planar surface for forming yoke 310.

A protecting coating 320 is then formed on the wafer surface, which after dicing the wafer to separate head 100 from other heads becomes trailing end 322. Another protective coating 323 is applied to a surface 325 of the head that in operation faces a media 330, a portion of the media being shown in FIG. 15. The coating is thin; and may be transparent, so as the media facing side of the head displays features such as those shown in FIG. 2 or FIG. 14. The media 330 may for example be a rigid disk including a disk substrate 333, and undercoat or template 335, a media layer or layers 338, and a protective overcoat 340 on a media surface 342. The media may travel in the direction of arrow 344 relative to head 100. During this relative motion, the narrow pole-tip 303 may write and/or the narrow sensor 101 may read signals on the media along a track that is substantially parallel with arrow 344.

Although we have focused on teaching the preferred embodiments of a novel narrow sensor and head, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. A transducer comprising:

first and second magnetically soft shield layers, nonferromagnetic, electrically insulating material disposed between said first and second shield layers, a magnetoresistive sensor disposed between said first and second shield layers and adjacent to said nonferromagnetic, electrically insulating material, said magnetoresistive sensor including first and second ferromagnetic layers separated by a nonferromagnetic layer, and an electrically conductive layer disposed between said second shield layer and said magnetoresistive sensor, said electrically conductive layer adjoining said magnetoresistive sensor at a junction, said junction having a perimeter adjoining said insulating material and an interior that is essentially free of said insulating material, wherein said sensor has a width measured in a direction substantially parallel to a media-facing surface and perpendicular to a shortest direction between said shield layers, said sensor width being less than one-quarter micron.

2. The transducer of claim 1, wherein said electrically conductive layer is magnetically soft.

3. The transducer of claim 1, wherein said electrically conductive layer is nonferromagnetic.

4. The transducer of claim 1, wherein said electrically conductive layer has a width measured in a direction substantially parallel to a media-facing surface and perpendicular to a shortest direction between said shield layers, said width being smaller adjacent said sensor than adjoining said second shield layer.

5. The transducer of claim 1, wherein said electrically conductive layer has a growth morphology that is transverse to a shortest direction between said shield layers.

6. The transducer of claim 1, wherein said nonferromagnetic layer is electrically conductive.

7. The transducer of claim 1, wherein said nonferromagnetic layer is electrically insulating.

8. The transducer of claim 1, wherein said ferromagnetic layers, said nonferromagnetic layer and said electrically conductive layer are vacuum-deposited.

9. The transducer of claim 1, further comprising a magnetically soft loop substantially encircling an electrically conductive coil and terminating in first and second magnetically soft layers separated by a nonmagnetic gap layer, said second magnetically soft layer composed of vacuum-deposited material and oriented substantially perpendicular to said gap layer.

10. The transducer of claim 1, wherein said sensor has a length measured in a direction substantially parallel to a shortest direction between said first and second shield layers and a width measured in a direction substantially parallel to a media-facing surface and perpendicular to said length, and said length is greater than one-fifth said width.

11. A transducer comprising:

first and second magnetically soft shield layers, nonferromagnetic, electrically insulating material disposed between said first and second shield layers, a magnetoresistive sensor disposed between said first and second shield layers and adjacent to said nonferromagnetic, electrically insulating material, said magnetoresistive sensor including first and second ferromagnetic layers separated by a nonmagnetic layer, said first and second ferromagnetic layers having a growth morphology oriented substantially perpendicular to said nonferromagnetic layer, and an electrically conductive layer disposed between said second shield layer and said magnetoresistive sensor, wherein said electrically conductive layer has a growth morphology transverse to said growth morphologies of said first and second ferromagnetic layers.

12. The transducer of claim 11, wherein said electrically conductive layer is magnetically soft.

13. The transducer of claim 11, wherein said electrically conductive layer is nonferromagnetic.

14. The transducer of claim 11, wherein said sensor has a width measured in a direction substantially parallel to a media-facing surface and perpendicular to a shortest distance between said shield layers, said width being less than one-quarter micron.

15. The transducer of claim 11, wherein said electrically conductive layer has a width measured in a direction substantially parallel to a media-facing surface and perpendicular to a shortest distance between said shield layers, said width being smaller adjacent said sensor than adjoining said second shield layer.

16. The transducer of claim 11, wherein said sidewall layer has a growth morphology that is transverse to a shortest direction between said shield layers.

17. The transducer of claim 11, wherein said nonferromagnetic layer is electrically conductive.

18. The transducer of claim 11, wherein said nonferromagnetic layer is electrically insulating.

19. The transducer of claim 11, wherein said ferromagnetic layers, said nonferromagnetic layer and said electrically conductive layer are vacuum-deposited.

20. The transducer of claim 11, further comprising a magnetically soft loop substantially encircling an electrically conductive coil and terminating in first and second magnetically soft layers separated by a nonmagnetic gap layer, said second magnetically soft layer composed of vacuum-deposited material and oriented substantially perpendicular to said gap layer.

21. The transducer of claim 11, wherein said sensor has a length measured in said direction substantially perpendicular to said nonferromagnetic layer and a width measured in a direction substantially parallel to said nonferromagnetic layer, and said length is greater than one-fifth said width.

22. A transducer comprising:

first and second magnetically soft shield layers, nonferromagnetic, electrically insulating material disposed between said shield layers, a magnetoresistive sensor disposed between said first and second shield layers adjacent to said nonferromagnetic, electrically insulating material, said magnetoresistive sensor including first and second ferromagnetic layers separated by an essentially nonferromagnetic layer, said first ferromagnetic layer having a growth morphology oriented substantially parallel to a smallest dimension of said nonferromagnetic layer, and an electrically conductive layer disposed between said second shield layer and said magnetoresistive sensor, wherein said electrically conductive layer has a growth morphology transverse to said growth morphology of said first ferromagnetic layer.

23. The transducer of claim 22, wherein said electrically conductive layer adjoins said magnetoresistive sensor at a junction, said junction having a perimeter adjoining said insulating material and an interior that is essentially free of said insulating material.

* * * * *